Sept. 10, 1935.　　　　D. J. STEWART　　　　2,013,676
POSITION CONTROL APPARATUS
Original Filed Aug. 20, 1930　　10 Sheets-Sheet 1

INVENTOR
Duncan J. Stewart
BY
Chindahl Parker Carlson
ATTORNEYS

Sept. 10, 1935.  D. J. STEWART  2,013,676
POSITION CONTROL APPARATUS
Original Filed Aug. 20, 1930   10 Sheets-Sheet 3

INVENTOR
Duncan J. Stewart
BY
ATTORNEYS

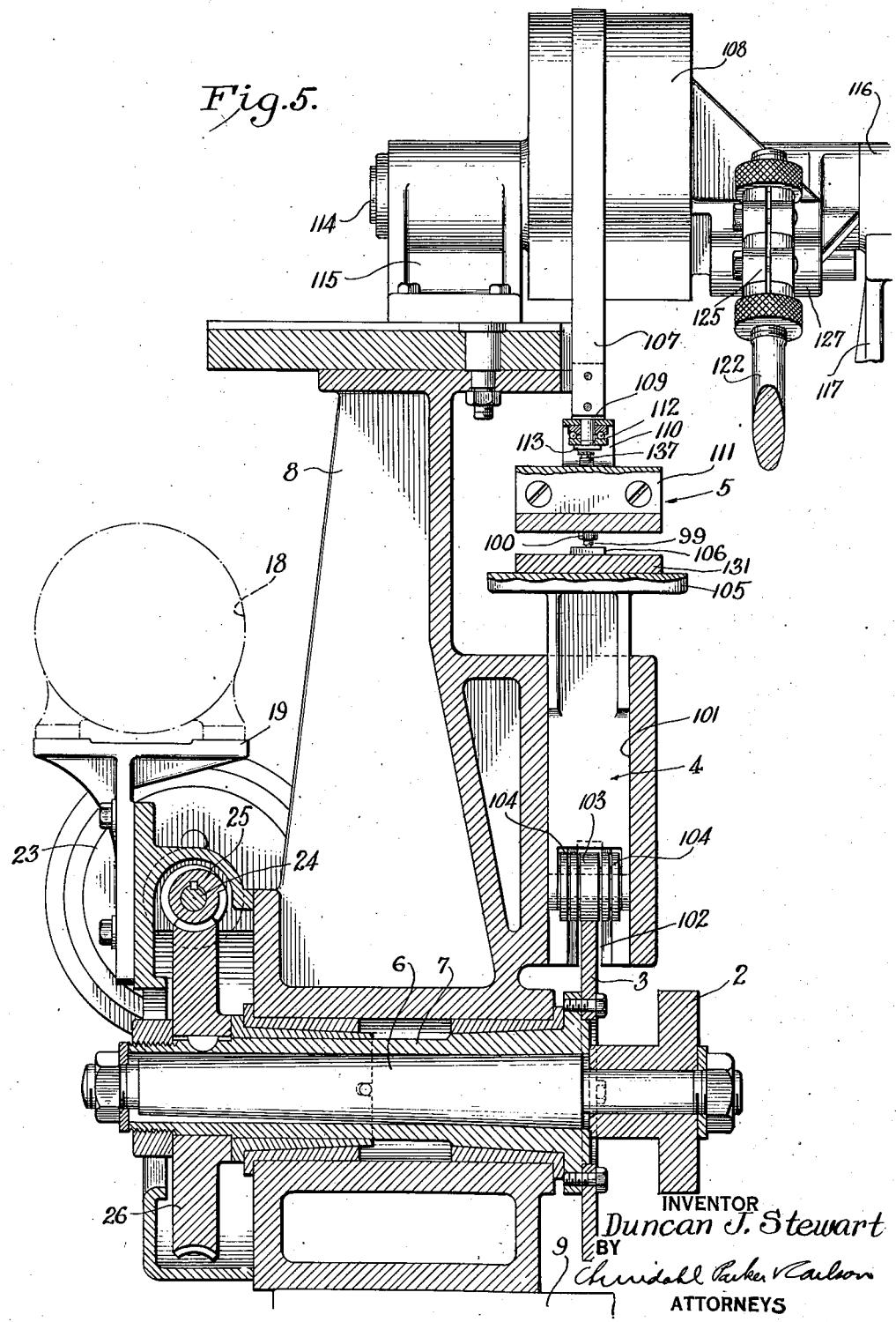

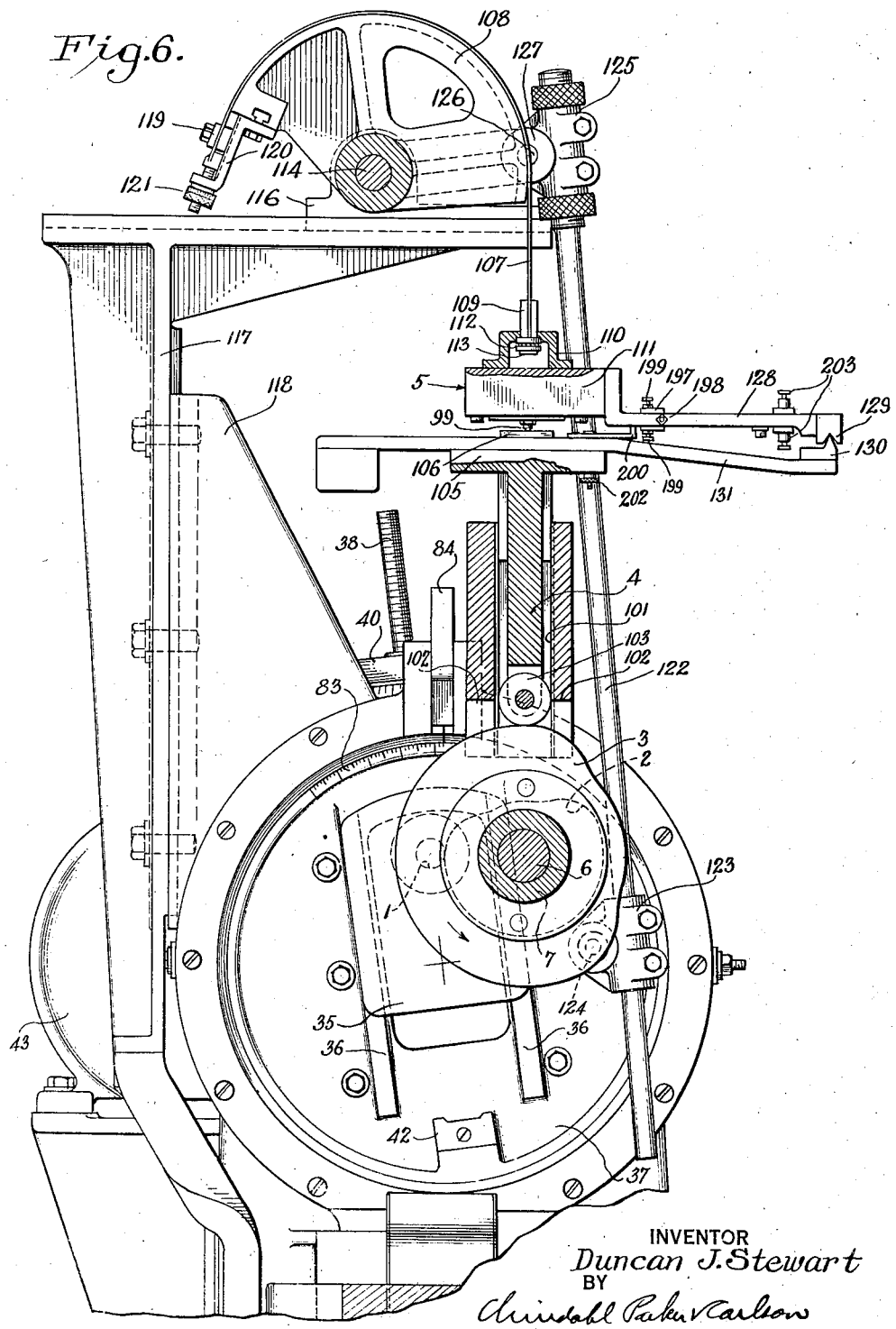

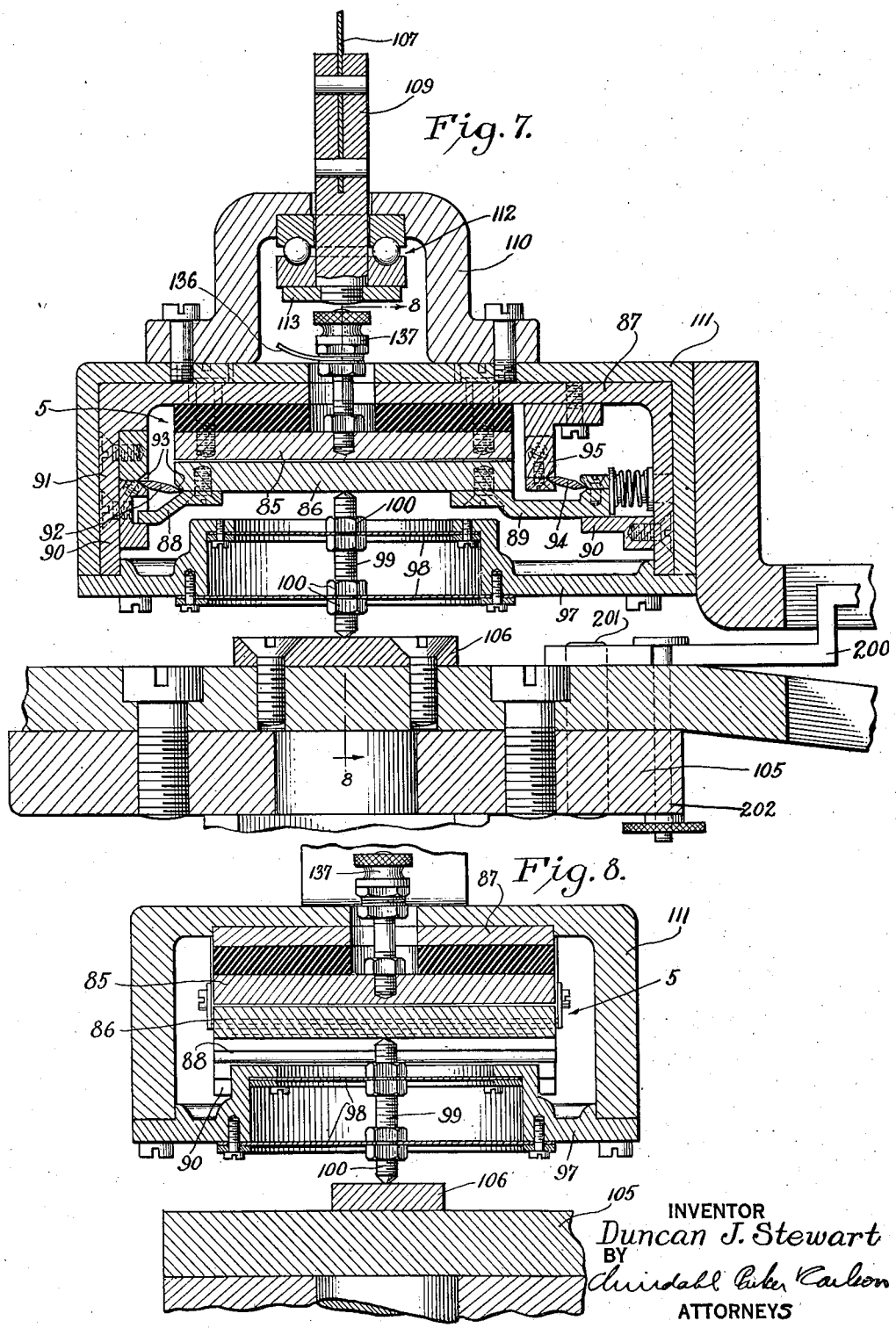

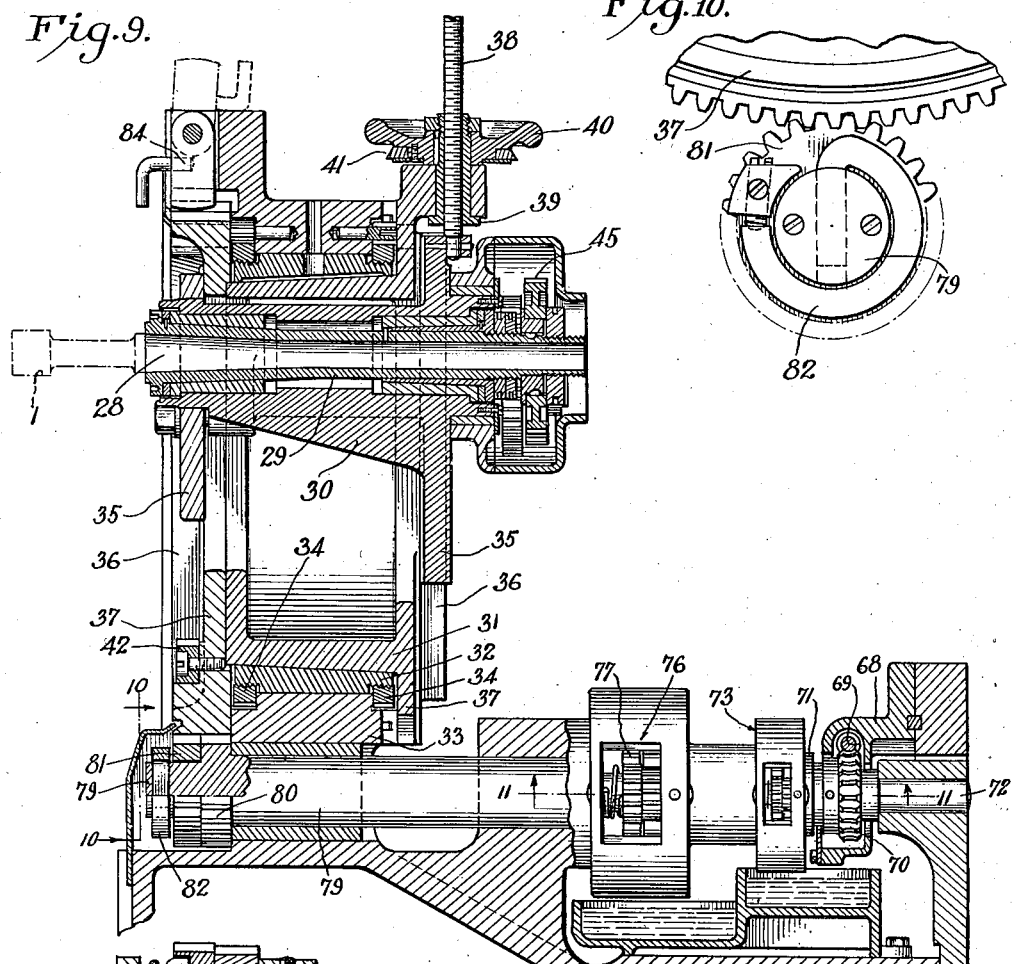

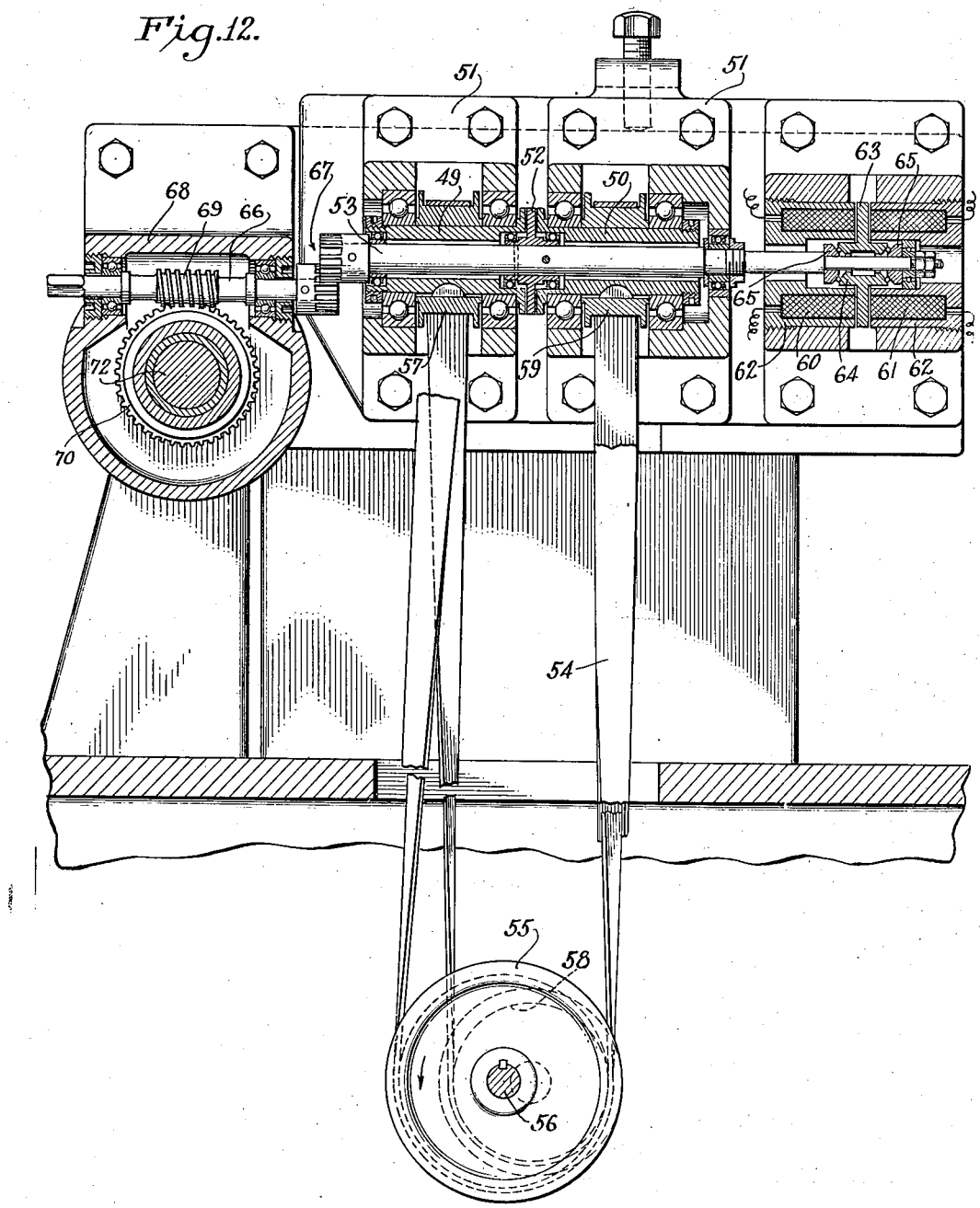

Sept. 10, 1935. D. J. STEWART 2,013,676
POSITION CONTROL APPARATUS
Original Filed Aug. 20, 1930  10 Sheets-Sheet 9

INVENTOR
Duncan J. Stewart
BY
Chindahl Parker Carlson
ATTORNEYS

Sept. 10, 1935.    D. J. STEWART    2,013,676
POSITION CONTROL APPARATUS
Original Filed Aug. 20, 1930    10 Sheets-Sheet 10

INVENTOR
Duncan J. Stewart
BY
Chindahl Parker Carlson
ATTORNEYS

Patented Sept. 10, 1935

2,013,676

UNITED STATES PATENT OFFICE 2,013,676

POSITION CONTROL APPARATUS

Duncan J. Stewart, Rockford, Ill., assignor to Howard D. Colman, Rockford, Ill.

Application August 20, 1930, Serial No. 476,557
Renewed November 30, 1934

34 Claims. (Cl. 90—13.4)

This invention relates to a system for controlling the position of one object in accordance with the position of another object and has more particular reference to the automatic control of the movements of cutting tools and the like in cam cutting, die-sinking or other machines for shaping the surface of a work blank to conform to a. pattern.

The general object of the invention is to provide a novel mechanism of the above class by which a higher degree of accuracy than has been possible heretofore may be obtained in the positioning of a controlled object to correspond to the position of a controlling object.

Another object of the invention is to provide a new and improved means for detecting with extreme accuracy variations in positional relation of a cutting tool and a pattern controlled object and controlling, in accordance with such variations, a power driving means for effecting relative feeding movements between the tool and a work blank so as to maintain the positional relation between the tool and controlling object substantially constant while the surface of the work blank is being traversed.

Minute variations in electrical impedance such, for example, as the capacity of a variable condenser having closely spaced plates may be measured with a high degree of accuracy. Therefore, in carrying out the foregoing object, an electrical impedance is gradually and constantly varied in response to the movement of a pattern controlled object such as a tracer and also according to the movement of a cutting tool and a work blank relative to each other, and the variations in impedance above and below a predetermined value are utilized to control the direction of feed between the tool and work blank so that the impedance and therefore the positional relation of the tracer and tool are maintained within a narrow range of variation.

Another object of the invention is to provide a novel electrical means for detecting the variations in the reactance of the device above mentioned and controlling the direction and extent of tool feed in accordance with such variations.

Still another object is to provide a novel means for conditioning the electrical means preparatory to a contouring operation.

Other objects and advantages of the invention will become apparent from the following detailed description taken in connection with the accompanying drawings, in which, Figure 1 is a front elevational view of a machine tool embodying the features of the present invention.

Fig. 5 is a sectional view taken along the line 5—5 of Fig. 1.

Figure 2:
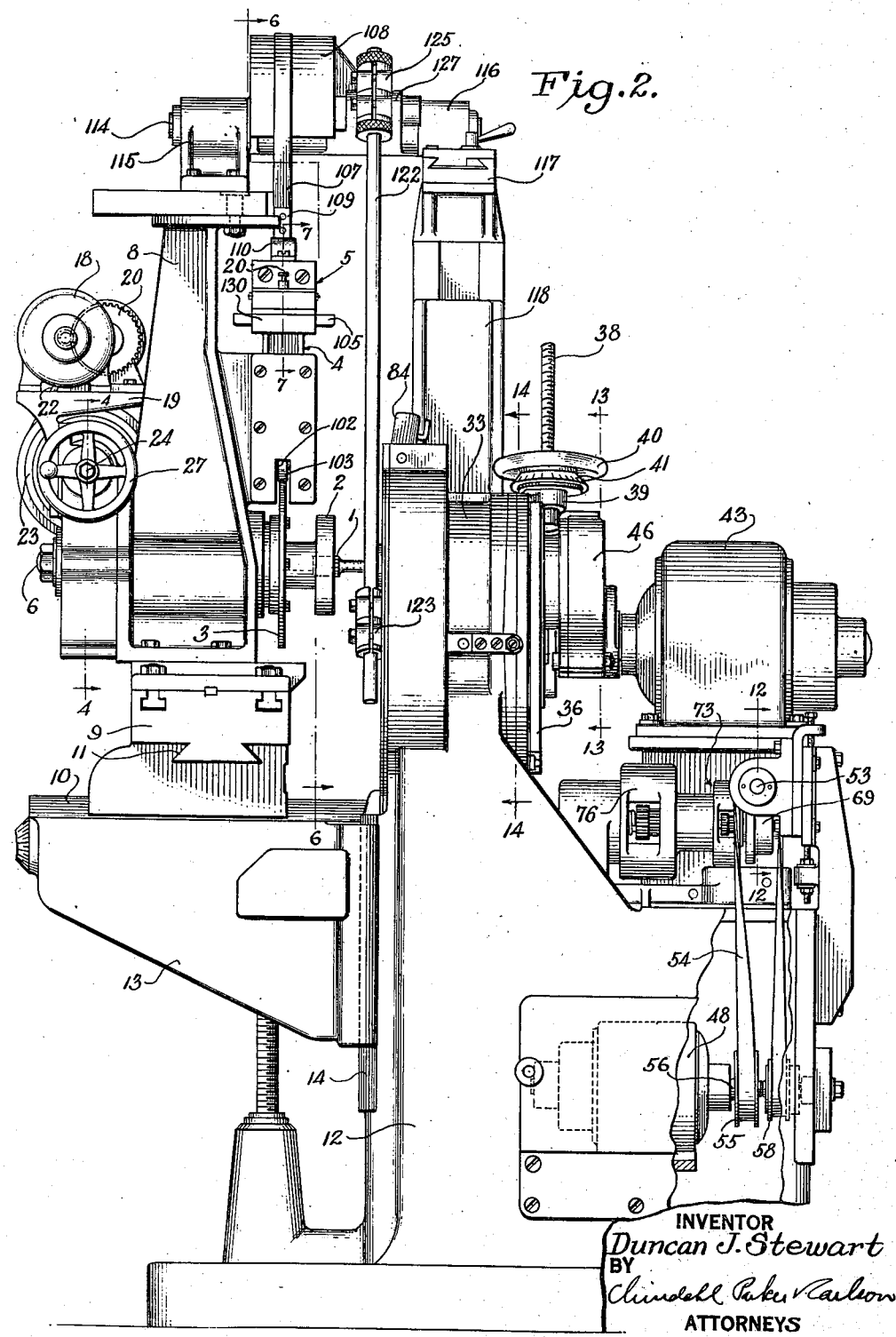
Fig. 2 is a side elevation of the machine looking from the left in Fig. 1.

Figs. 6 and 7 are sectional views taken respectively along the lines 6—6 and 7—7 of Fig. 2.

Fig. 8 is a sectional view taken along the line 8—8 of Fig. 7.

Figure 3:
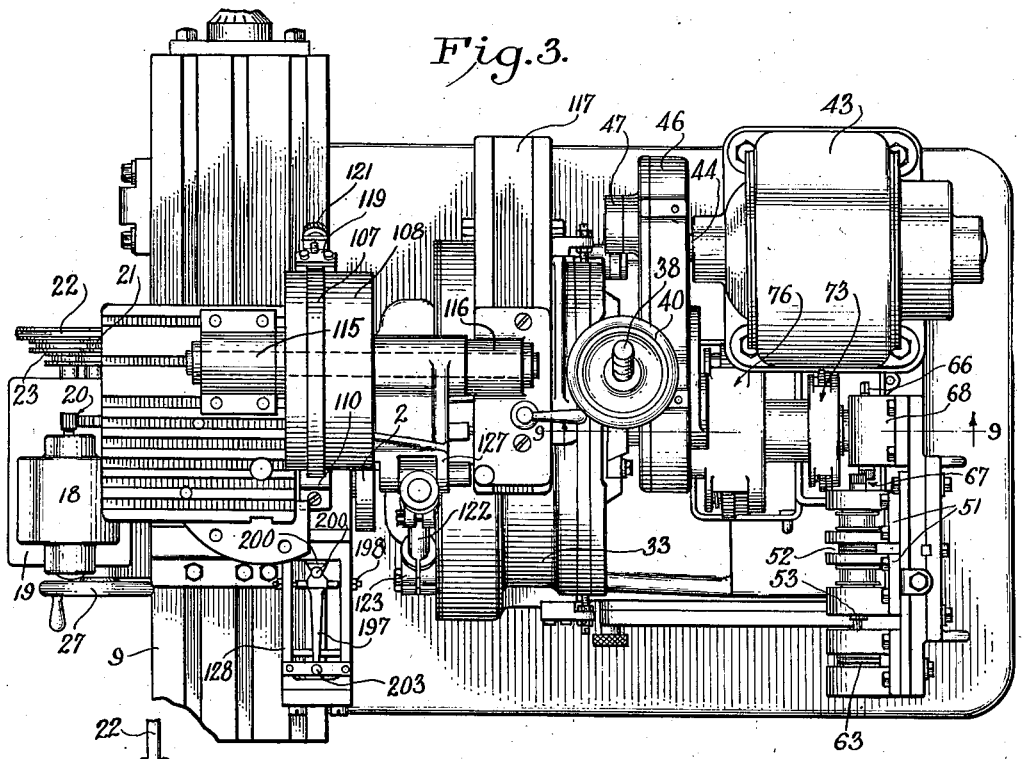
Fig. 3 is a plan view of the machine.

Fig. 9 is a sectional view taken along the line 9—9 of Fig. 3.

Figs. 10 and 11 are sectional views taken respectively along the lines 10—10 and 11—11 of Fig. 9.

Figure 13:
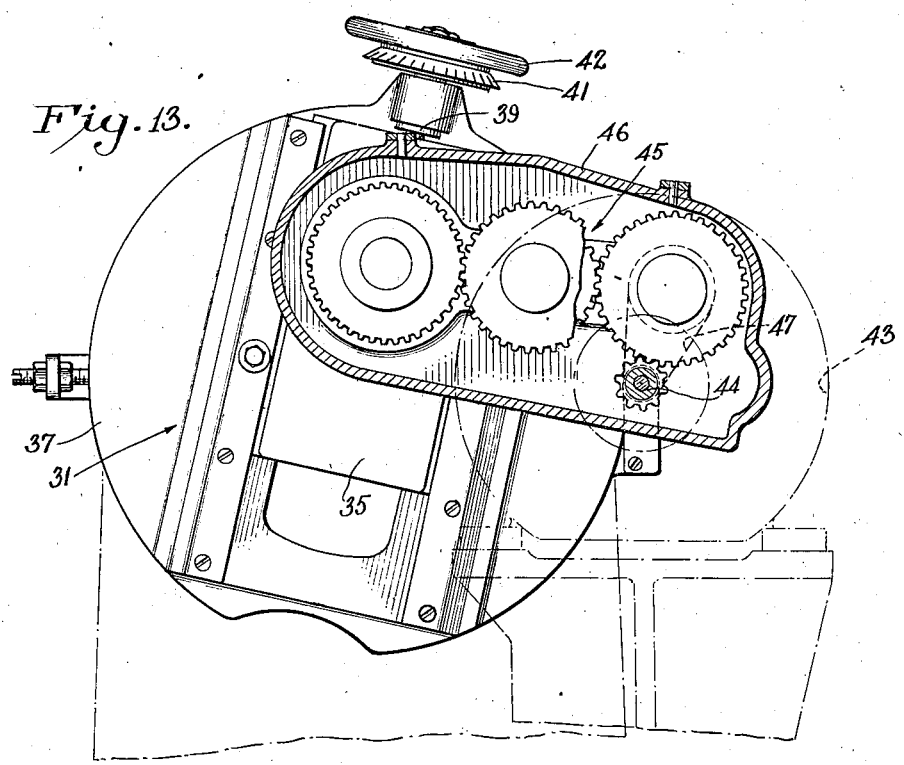
Figure 14:
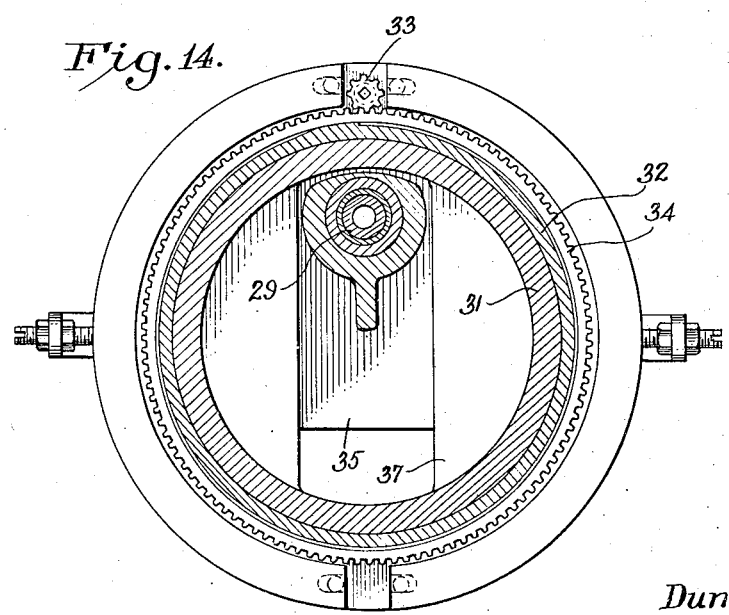

Figs. 12, 13 and 14 are sectional views taken respectively along the lines 12—12, 13—13 and 14—14 of Fig. 2.

Figure 15:
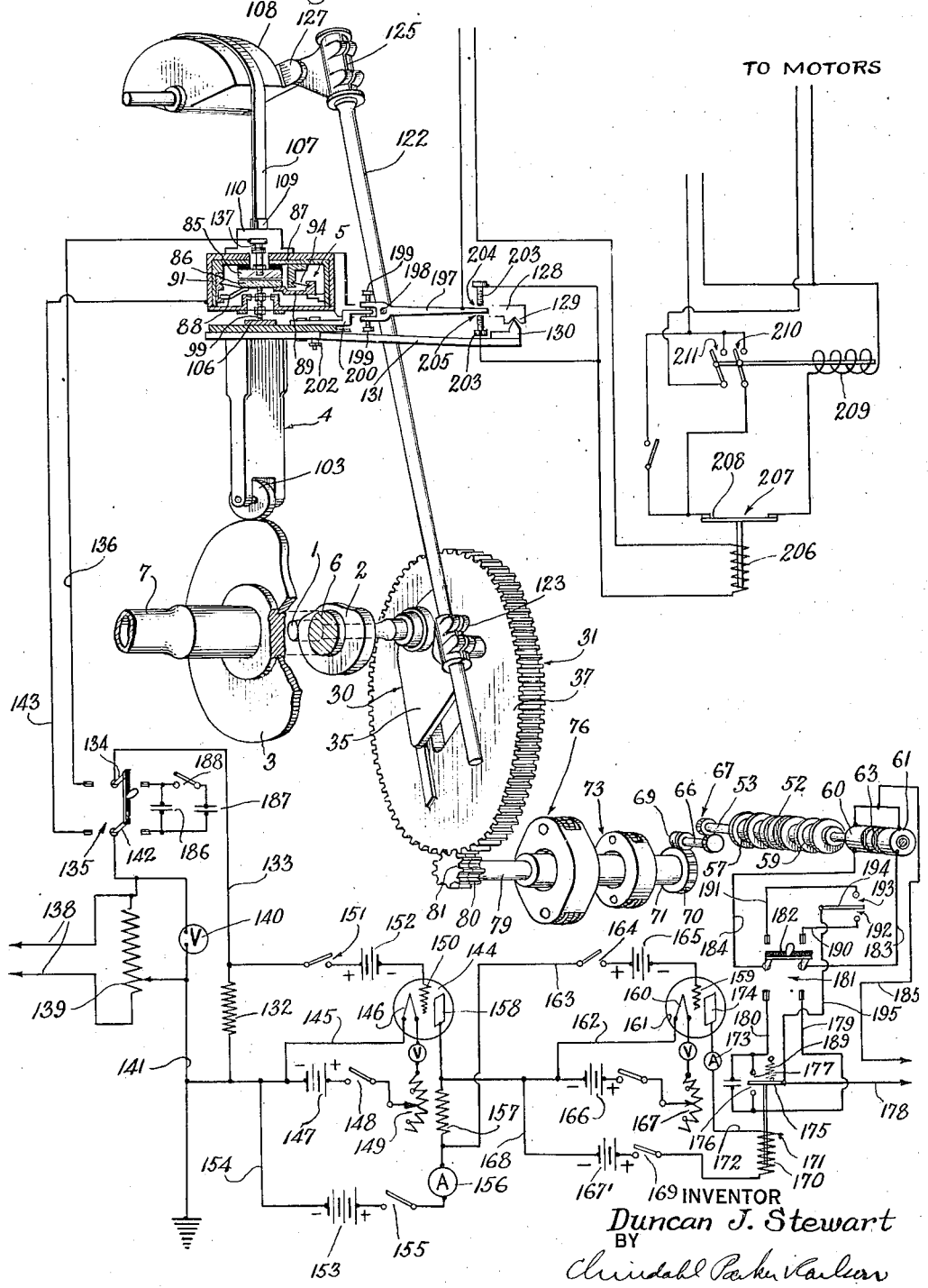

Fig. 15 is a schematic view and wiring diagram of the principal parts of the machine and the controls therefor.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

*The invention in general*

The invention is especially adapted for use in the automatic control of a power driving mechanism for effecting relative movements between a controlled object, such for example as a cutting tool, and a work blank to be operated thereon. In the present instance, the control is utilized in a machine for cutting cam surfaces embodying a tool 1 adapted to be fed relative to a work blank 2 in opposite directions along a single fixed path according to variations in the surface of a pattern 3, which variations are detected by a controlling object such as a feeler 4.

The movement of the controlling object and also the relative movement between the tool and work blank are communicated to an electrical device having a variable impedance which changes gradually and automatically in response to changes in the positional relation of the controlling and controlled objects. In the present instance, the device is a condenser 5 (Figs. 7, 8 and 15) having closely spaced plates, and the variations in the capacity reactance above and below a predetermined value are detected by means including a thermionic tube and utilized through appropriate electromagnetic means to control selectively the direction of feed of the tool by a power driving means. The direction of such feed is always such that the change in the condenser capacity accompanying the change in the position of the tool opposes the capacity change due to the feeler 4, with the result that the spacing of the condenser plates and therefore the condenser capacity remains approximately at said predetermined value and within an extremely narrow range of variation therefrom. In this way, a predetermined positional relation between the feeler and the tool is accurately and automatically maintained while different portions of the pattern surface are being presented to the feeler and corresponding portions of the work blank are presented to the tool.

While the present system of control is adapted for use with various types of cutting tools, it is preferred to employ a cutter of the rotary type which may be fed into and out of the work to produce cuts of different depths simply by shifting the cutter axis laterally.

*Support for the work blank and pattern and advance thereof*

Figure 1:
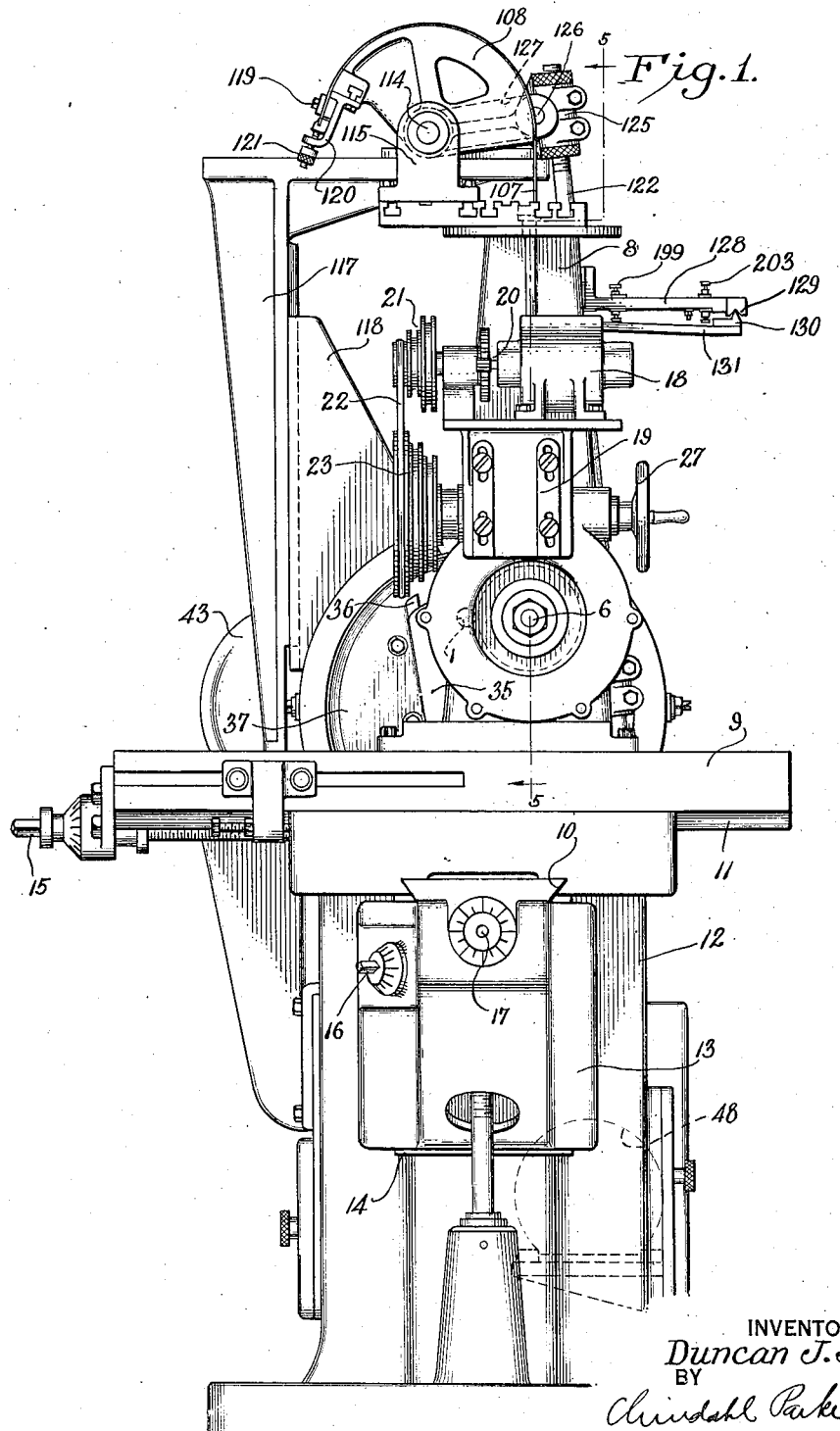

In the present machine, which is adapted for cutting a cam surface of the open-face type around a peripheral surface of the work blank, the blank and the master cam pattern are mounted on a common support and adapted for rotation continuously at a slow speed to present successive portions of the blank and master cam to the cutter 1 and tracer 4 respectively. For this purpose, the blank is supported on and rigidly secured to one end of an arbor 6 (Fig. 5) which is pressed into and thereby made rigid with a driving spindle in the form of a sleeve 7 having a flanged end to which the master cam disk 3 is detachably but rigidly secured. The spindle projects through and is journaled in the lower end of a pedestal 8 upstanding from a carriage 9 (Fig. 2) mounted to slide horizontally along ways 10 and 11 and supported from the machine bed 12 by a knee 13 which is slidable along vertical ways 14. Adjustment of the carriage along the different ways to set the pattern and blank initially for the milling operation may be effected by manual rotation of the usual screw shafts 15, 16 and 17 (Fig. 1).

Figure 4:
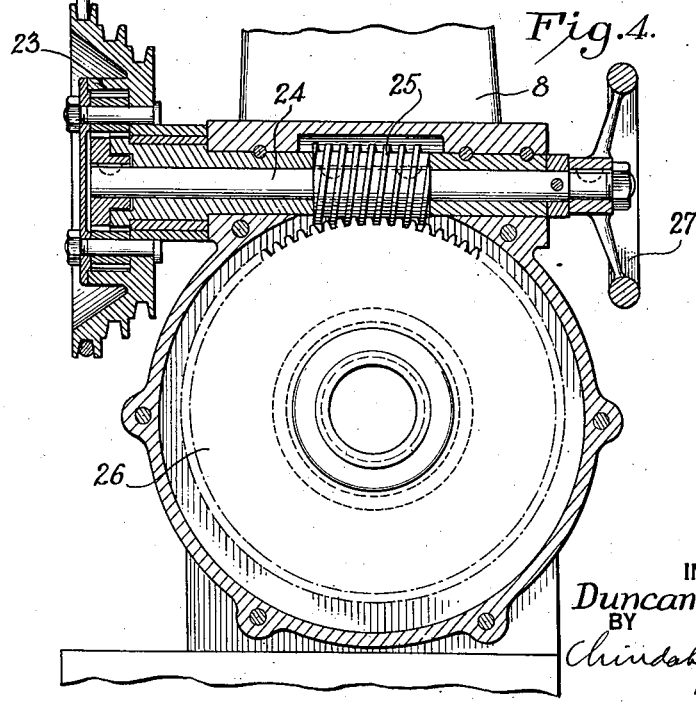
Fig. 4 is a sectional view taken along the line 4—4 of Fig. 2.

Power for rotating the spindle 7 is supplied by an individual electric motor 18 supported by the carriage through the medium of a vertically adjustable bracket 19 and acting through the medium of a gearing 20, cone pulleys 21, a belt 22, a planetary gearing 23 (Fig. 4), to drive a shaft 24 which carries a worm 25 meshing with a worm wheel 26 fast on the end of the spindle sleeve 7 opposite the master cam. With this gearing, the spindle is rotated at a very slow speed which may be varied within the desired limits by shifting the belt 22. The blank and master cam may, when desired, be rotated by hand by turning a wheel 27 fast on the shaft 24.

*Mounting and drive for the tool*

Herein the tool 1 is a rotary milling cutter whose axis is disposed parallel to and is shiftable laterally toward and away from the axis of the work so that the cutter may be fed into and out of the periphery of the work at the same time that successive sections of the periphery are being presented to the cutter. To support the cutter for such feeding movement, its tapered shank 28 (Fig. 9) is received in one end of a spindle sleeve 29 journaled at spaced points in a tool slide in the form of a tubular head 30 located eccentrically with respect to the axis of a supporting cradle in the form of a hollow drum 31 mounted in the bed of the machine in end-to-end relation with respect to the work spindle 7.

The drum 31 is mounted for a limited degree of oscillation about a fixed axis spaced from and extending parallel to the work axis so that angular movement of the drum in opposite directions will carry the cutter toward and away from the work axis and thereby vary the depth of the cut made by the tool. To this end, the peripheral surface of the drum is journaled in an annular bearing 32 (Fig. 9) supported by a casing 33 through the medium of two threaded rings 34. The cooperating surfaces of the drum and bearing are tapered so that looseness in the drum mounting may be taken up by turning the rings 34 and thereby shifting the bearing axially.

In order that the eccentricity of the cutter relative to the cradle axis may be varied, the head 30 is constructed at opposite ends with rectangularly-shaped flanges 35 which are slidable in radial guideways 36 formed by plates 37 which are rigid with opposite ends of the drum 31. A screw shaft 38 (Fig. 9) rigid at one end with the head 30, threads into a rotatable sleeve 39 journaled in the drum casing and carrying a handwheel 40. By turning the latter in opposite directions, the head may be moved radially of the drum any desired distance as indicated by a scale 41. When the head is in engagement with a stop 42 (Fig. 6), the axis of the cutter coincides with that of the drum.

With the cutter thus mounted, it will be apparent that angular movement of the drum 31 will feed the cutter toward or away from the axis of the work in a fixed arcuate path determined by the radial spacing of the head relative to the drum axis.

The cutter spindle 29 is driven constantly from an individual source of motive power which comprises an electric motor 43 (Fig. 3) supported on the machine base and having its shaft 44 connected through a gear train 45 (Fig. 13) with the end of the spindle 29 opposite the cutter. The gears of the train are rotatably supported within a housing 46 which is pivoted at one end to the tool slide 30. The other end of the housing is pivotally connected to one end of a link 47 (Figs. 3 and 13) whose other end is pivoted on the machine base to swing about an axis coincident with the motor shaft. This arrangement provides for rotation of the cutter from the stationarily mounted motor in all of the different positions of the cutter.

*Tool feed*

Power for feeding the cutter in opposite directions toward and from the work axis is derived from a third individual electric motor 48 (Fig. 2) and applied to the supporting cradle or drum 31 through the medium of an electromagnetically controlled reversing mechanism and a system of gearing capable of effecting an extremely large reduction in the speed of the motor. The direction of the cutter feed is determined by the reversing mechanism which operates to feed the cutter constantly in one direction or the other but through varying distances governed by the contour of the pattern surface.

As best shown in Fig. 12, the reversing mechanism herein employed includes two magnetic friction clutches having oppositely rotating driving elements in the form of sleeves 49 and 50 arranged in end-to-end relation and mounted in ball-bearings supported by a bracket plate 51 upstanding from the top of the machine base and spaced from the drum 31. The adjacent ends of the sleeves are formed with flanges whose opposing surfaces are adapted for frictional gripping engagement with opposite sides of a disk 52 fast on a shaft 53 which constitutes the common driven element of the two clutches. This shaft extends axially through the sleeves, and is supported thereby through the medium of ball-bearings which permit of slight axial movement so that the disk 52 may be carried into engagement with either of the driving surfaces. The sleeves 49 and 50 are driven at high speed from the motor 48 by means of a single endless belt 54 which passes successively around a pulley 55 fast on the motor shaft 56, a pulley 57 fast on the sleeve 49, an idler pulley 58, and a pulley 59 keyed to the sleeve 50.

Axial shifting of the shaft 53 to cause engagement of the two clutches selectively is controlled by two electromagnets 60 and 61 whose ring-shaped cores 62 have friction faces disposed on opposite sides of an armature in the form of a disk 63 of magnetic material rotatable on but held against axial movement relative to an extended end portion of the shaft 53. For this purpose, the hub 64 of the disk is supported through ball-bearings by two disks 65 rigid with the shaft 53 and having conical bearing surfaces. With this arrangement, it will be apparent that the magnet 60 will, when energized, attract the armature causing the driven clutch disk 52 to engage the sleeve 49 while reverse rotation of the shaft will occur upon energization of the magnet 61. The electromagnets provide for the required sensitivity of control for the power actuated cutter drive while the employment of clutches of the friction type causes immediate response of the reversing mechanism to the selective magnetic control.

Rotary motion of the shaft 53 is transmitted to a shaft 66 (Fig. 12) through the medium of intermeshing pinions 67 which permit of the axial movement of the shaft required to operate the two clutches. Within a housing 68, the shaft 66 carries a worm 69 meshing with a worm-wheel 70 which is rigid with a sleeve 71 rotatably supported by a non-rotatable shaft 72. The sleeve 71 constitutes the driver of a planetary gearing generally designated by the numeral 73 (Fig. 11) and rotatable about a gear 74 fast on the shaft 72. This gearing drives a sleeve 75 also rotatable on the shaft 72 and constituting the driver of a second planetary gearing 76 which rotates about a stationary gear 78. The driven gear 77 of the second planetary system is fast on a shaft 79 and projecting parallel to the axis of the drum 31. This shaft carries a pinion 80 meshing with gear teeth formed around the outer periphery of the end plate 37 of the drum. A loose gear 81 meshing with the teeth on the drum is also carried by the shaft 79. An adjustable spring 82 (Fig. 10) acting in torsion between the gear 81 and the shaft 79 serves to take up any back-lash in the connection between the shaft and the drum.

The worm gearing and the two planetary gears constitute the speed reducing system above referred to and are so constructed that the reduction in the motor speed is approximately in the ratio of 70,000 to 1. With this large reduction, it will be apparent that a large number of revolutions of the motor shaft will be required to cause a perceptible feeding motion of the cutter.

By turning a crank fitted onto the outwardly projecting end of the shaft 66 (Fig. 12), the drum 30 may be moved by hand to position the cutter properly preparatory to the cam cutting operation. This position may be gaged from a scale 83 (Fig. 6) marked on a peripheral surface of the end plate 37. To lock the drum and therefore the cutter 1 in any predetermined position while the blank is being brought into proper position, an arm 84 pivoted on a stationary part of the machine may be swung from a normally inactive position to the full line position shown in Fig. 9 into the space between adjacent teeth of the drum gear when the tool slide is in truly vertical position.

Condenser construction and mounting

The condenser 5, which is used in the present machine for detecting minute variations in the relative positions of the master cam tracer 4 and the cutter, comprises two metallic plates 85 and 86 (Figs. 7 and 8) having opposed parallel surfaces of equal areas machined and polished to a high degree of flatness. Air is employed as the dielectric to permit relative approaching and receding movement of the condenser elements. The condenser is housed within a closed casing to exclude dust and other particles from the surfaces which are always slightly removed from or disposed just out of contacting engagement with each other, being spaced apart approximately .001 inch in the present instance. With the plates thus closely spaced, the movement of one or the other plate will produce a large and readily detectable percentage increase in the capacity of the condenser. In order to lighten the associated parts and facilitate the maintenance of their surfaces in true parallel planes, the plates preferably are disposed in horizontal planes.

One of the plates may be mounted for bodily movement perpendicular to its flat surface in response to the movements of the tracer and also of the cutter or, as in the present instance, both plates may be arranged for movement, one by the tracer and the other by the cutter. To this end, both plates are disposed within a housing formed in part by a plate 87 to which the plate 85 is secured but separated therefrom by a sheet of insulating material.

The lower condenser plate 86 is mounted with the housing for limited motion relative to the upper plate and is guided in such movement by means capable of maintaining exact parallelism of the plate surfaces. Outwardly projecting arms 88 and 89 rigid with the plate 86 are adapted to rest on ledges 90 projecting inwardly from a depending flange 91 of the plate 87 and serving to limit the movement of the plate 86 away from the upper plate. At one side of the plate 86 is a knife blade 92 slightly inclined relative to the horizontal with its opposite ends having bearing in V-shaped grooves 93. The opposite side of the lower plate is guided by a blade 94 extending parallel to the blade 92 and having bearing in grooves formed in the arm 89 and in a lug 95 depending from the plate 87. A spring 96 urges the plate 86 in a direction to hold the blades in their bearings. The blades thus constitute a parallel motion a mechanism which maintains the opposite sides of the plates 85 and 86 equally spaced during their limited motion relative to each other.

The lower end of the condenser housing is completely closed by a plate 97 secured at its edges to the flange 91 and having a central aperture in which two flexible metal diaphragms 98 are supported. A threaded feeler pin 99 projects through and is secured by nuts 100 to the diaphragms with its upper end adapted for bearing engagement with the central portion of the lower hardened surface of the condenser plate 86. Thus the pin 99 is freely movable in an axial direction to raise and lower the plate 86 and thereby decrease and increase the capacity of the condenser. When the pin is unsupported by external means, the lower plate 86 rests on the ledges 90.

*Tracer control of condenser*

In the present instance, the feeler or tracer element 4 above generally referred to comprises an elongated rigid bar mounted in longitudinal alinement with the feeler pin 99 for reciprocation in a vertical path intersecting the axis of the master cam 3. Herein the bar is slidable in ways 101 (Figs. 5 and 6) defined by a rigid extension of the pedestal 8, the lower end of which extension is formed with slots 102 to receive the upper peripheral portion of the master cam disk when the latter is positoined as previously described.

The lower end of the bar 4 is bifurcated and carries a cross-pin on which is rotatably mounted an anti-friction roller 103 which rests upon and follows the contour of the master cam surface, the bar 4 sliding up and down in its guideway as the master cam is rotated through one revolution. Also mounted on the cross-pin on opposite sides of the roller 103 are rollers 104 which bear against the sides of the guideway 101 and thereby maintain the roller 103 accurately positioned. Rigid with the upper end of the feeler bar 4 is a flat topped table 105 carrying a hardened metal disk 106 upon which the lower pointed end of the pin 99 bears so that the vertical motion of the bar is communicated to the lower condenser plate. With the feeler 4 thus mounted and associated with the condenser, there is at all times a uniform load on the master cam surface which avoids the introduction of errors due to the spring of the parts.

*Cutter control of the condenser*

The oscillatory feeding movements of the cutter 1 about the axis of the drum 31 are converted into reciprocatory motion which is applied to the upper condenser plate 85 in a direction to move the plate toward and from the lower plate 86 in response to movements of the cutter respectively toward and from the work axis. To this end, the condenser housing is attached to the downwardly hanging end of a flexible metal tape 107 whose other end follows around the circumference of a segmental drum 108 which is oscillated by the cutter through a connection with the cradle 31. At its lower end, the tape 107 is attached to a bar 109 (Fig. 7) projecting into a yoke 110 secured to a casing 111 which in turn encloses and is made rigid with the condenser housing plate 87. The yoke is supported through a ball-bearing 112 resting on a flange 113 at the lower end of the bar 109 and permitting the work carriage, the tracer, and the condenser to be swung through an angle of ninety degrees as is required to adapt the present machine for the cutting of barrel cams.

The drum sector 108 is pivoted on a horizontal shaft 114 supported at one end in a bearing 115 which is supported by the upper end of the pedestal 8 and has a detachable connection therewith permitting the bearing to remain stationary during pivoting of the work carriage 9 for the purpose above mentioned. The other end of the shaft 114 is mounted in a bearing 116 rigid with the horizontal arm of an L-shaped bracket 117 (Fig. 6) which is adapted to be made rigid with but vertically adjustable along a pedestal 118 upstanding from the machine base and spaced laterally from the pedestal 8.

The tape 107 follows a substantial length of the sector surface and is secured to the drum sector through the medium of a clamp 119 slidable along a bracket 120 on the sector by a micrometer adjusting means including a thumb nut 121. With the aid of the clamp and the nut the effective length of tape and therefore the position of the condenser box may be varied with the required accuracy. The radius and center of curvature of the drum sector are such that the downwardly hanging end of the tape is tangent to the drum surface for all angular positions of the sector. In this way, the oscillatory movement of the drum sector is converted into reciprocatory motion of the straight end of the tape and the upper condenser plate.

In the present instance, oscillatory movement of the cutter cradle is transmitted to the drum sector 108 through the medium of a substantially rigid rod 122 to the lower end of which is secured a sleeve clamp 123 pivoted at 124 to the end plate 37 of the drum 31. At its upper end, the rod 122 carries an adjustable clamp 125 which is pivoted at 126 to the free end of an arm 127 rigid with the hub of the drum sector 108. The pivots 124 and 126 are spaced equidistant from the axes of the drums 31 and 108 so that when the effective length of the link 122 is adjusted to equal the distance between the drum axes, a parallelogram linkage is formed which oscillates the drums in unison through equal angular distances.

Assuming that a fixed distance is maintained between the condenser plates by oscillating the cutter cradle, it will be apparent that the above linkage connection provides for movement of the pivot 124 through arcuate distances exactly equal to that of the master cam tracer. The cutter, being carried by the drum, moves corresponding distances, the ratio of the cutter movements to those of the pivot 124 being determined by the relative radial positions of the pivot and cutter axis. The relation of the rises and falls on the master pattern to those on the cam to be formed are thus determined.

From the foregoing, it will be apparent that the closely spaced condenser plates are arranged to follow each other upwardly and downwardly according to the pattern contour and during such movement in unison are adapted for a limited range of relative movement toward and away from each other, which range is less than .0001 inch in the present instance. During such relative movement, the plates are maintained in accurate alinement with each other which is accomplished in the present instance by a knife-blade guiding means. This means comprises an elongated horizontal arm 128 (Fig. 6) rigid with the housing 111 and having at its outer end a horizontal notch 129 receiving a blade 130 on the end of a counterbalance arm 131 integral with the table 105. This connection effectually maintains the two condenser plates in exact parallelism so that the capacity of the condenser is solely a function of the spacing of the plates.

Detection and utilization of impedance variations

In the present instance, the condenser 5 is utilized as a variable impedance and variations in its value relative to a predetermined mean value are detected by impressing an alternating current voltage across this variable impedance and a fixed impedance in series relation and then impressing the voltage drop across the fixed impedance upon the input circuit of an electric discharge device or thermionic tube whose output circuit controls the selective energization of the magnets 60 and 61. Herein the fixed impedance is in the form of a resistance element 132 (Fig. 15) one terminal of which is connected by a conductor 133 to one insulated blade 134 of a double-pole-double-throw switch 135. When the blade is thrown to the left as viewed in Fig. 15, the conductor 133 is joined to a conductor 136 leading to a binding post 137 rigid with the insulated condenser plate 85 and projecting through the casing 111.

Alternating current from supply conductors 138 is applied to the two insulated terminals of the condenser and the resistance element through the medium of a potentiometer 139 by which the voltage may be adjusted to the desired value and read on a voltmeter 140 connected across the output terminals of the potentiometer. One of these terminals is connected by a conductor 141 to one terminal of the resistance element 132. The other terminal is joined to the other blade 142 of the switch 135, which blade, when thrown to the left, becomes connected by a conductor 143 to the frame of the machine and therefore to the condenser plate 86.

With the circuit arrangement just described, the voltage drop $E_R$ across the resistance 132 may be expressed as follows:

$$E_R = \frac{ER}{\sqrt{R^2 + \frac{b^2}{(2 \times 3.1416 fPA)^2}}}$$

Where E is a voltage applied to the condenser and resistance element of R ohms, $f$ is the alternating current frequency, A is the area of each condenser plate, P is the dielectric constant and $b$ is the distance between the plates. When all of these factors excepting $b$ are constants, it will be apparent that separation of the plates will produce a decrease in the voltage across the resistance and a decrease in $b$ will increase this voltage.

To detect variations in this voltage drop, the latter is impressed upon the input circuit of a three element vacuum tube 144 with the result that the current in the output circuit of the tube decreases and increases as the condenser plates are moved away and toward each other respectively. For this purpose, one terminal of the resistance 132 is connected by a conductor 145 to the filament 146 of the tube which is heated by current from a battery 147 and flowing through a switch 148 and a rheostat 149. The other terminal of the resistance is connected to the grid 150 through the medium of a switch 151 and a battery 152 which serves to bias the grid and obtain proper rectification of the alternating voltage impressed upon it.

The output circuit of the tube is supplied with current from a battery 153 and extends from the grid 150 through conductor 145, a conductor 154, battery 153, a hand switch 155, an ammeter 156, and a coupling resistance 157 to the plate 158 of the tube.

In order to amplify the current in the output circuit of the tube 144, the voltage drop across the resistance 157 is impressed between the grid 159 and filament 160 of a second vacuum tube 161 by a conductor 162 connecting one terminal of the resistance 157 to the filament 160 and a conductor 163, switch 164, a battery 165 connecting the other terminal to the grid 159. The filament 160 is heated by a battery 166 under the control of a rheostat 167. The battery 165 serves to bias the grid of the tube 161. By proper inter-adjustment of the biasing potentials of the batteries 152 and 165, the sensitivity, that is the change in the plate current in the tube 161 for a given change in the capacity of the condenser 5, may be made a maximum. The output circuit of the amplifying tube 161 is supplied with current by a battery 167' and extends from the filament 160 through a conductor 168, battery 167', switch 169, the winding 170 of an electromagnetic relay 171, a conductor 172, an ammeter 173, to the plate 174 of the tube 161.

With the circuit arrangement above described, it will be apparent that the winding 170 is constantly energized and that an increase in the voltage drop across the resistance element 132, caused by movement of the condenser plates closer to each other, will result in a progressive increase in the current in the output circuits of the tubes 144 and 161 and therefore in the winding 170. On the other hand, the current energizing the relay will decrease progressively as the condenser plates move apart.

The intensity of the energizing current determines the position of the relay armature 175 through the medium of which the current variations are utilized to control the selective operation of switches 176 and 177 which govern the opening and closing of the circuits through the magnetic clutch windings 60 and 61 which in turn control the reversing mechanism to determine the direction in which the cutter is fed relative to the work and the direction of movement of the upper condenser plate 85.

The magnetic clutch circuits controlled by the switches 176 and 177 are arranged to be energized from a source of direct current, one terminal of which is connected by a conductor 178 to a terminal common to the two switches 176 and 177. The other terminals of the switches are connected respectively by conductors 179 and 180 to terminals of a double-pole-double-throw switch 181. When the actuator 182 of the latter switch is thrown downwardly as viewed in Fig. 15, the conductors 179 and 180 are connected to conductors 183 and 184 leading respectively to terminals of the windings 61 and 60. The other winding terminals are made electrically common and connected by a conductor 185 to the other terminal of the direct current source.

With the circuits thus arranged, the winding 60 will be energized and the winding 61 deenergized upon movement of the armature 175 under the influence of its spring 189 which occurs when the current energizing the winding 170 falls below a predetermined value in response to a separation of the condensers by a distance of more than .001 of an inch. Such energization of the winding 60 causes the cutter to be fed into the work and thereby make a deeper cut. In this movement of the cutter the condenser plates are brought closer together progressively, thereby increasing the current in the relay 170. By the time the plates have approached to within approximately .0009 inch of each other, the current in the relay will have increased to a value sufficient to overcome the influence of the spring 189 whereupon the armature will be drawn in a direction to close the switch 176 which results in energization of the clutch winding 61. This reverses the direction of the feed and the cutter is again moved out of the work and the condenser plates separated. The result is that the cutter oscillates back and forth relative to the axis of the work blank through a range not exceeding .0001 inch, which range is, of course, determined by the sensitivity of the control circuits.

*Conditioning of the control circuits*

Means is provided for enabling the operator to test the condition of the operating circuits above described and to adjust the plate currents and the grid biasing potentials for optimum sensitivity, that is, maximum current variation in the output circuit of the tube 161 in response to a given change in the condenser capacity. This means includes a condenser 186 connected to two terminals of the switch 135 so that it may be interposed in series relation with the resistance element 132 and thereby substituted for the condenser 5 when the actuator of the switch 135 is thrown to the right as viewed in Fig. 15. The capacity of the condenser 186 is fixed at a value just equal to the mean fixed value of the condenser 5, that is, the value when the plates 85 and 86 are spaced approximately .001 inch apart.

A second condenser 187 is adapted to be thrown in parallel with the condenser 186 upon closure of a switch 188 and the value of its capacity is such that the combined capacity of the two fixed condensers is just equal to the capacity of the condenser 5 when the plates of the latter are spaced .0009 inch apart. Closing and opening the switch 188 thus has the same effect on the control circuits as varying the spacing of the plates 85 and 86 from .001 inch to .0009 inch and vice versa. The grid biasing potentials produced by the batteries 152 and 165 are then adjusted so as to give a maximum variation in the relay current as indicated on the ammeter 173 when the switch 188 is opened and closed. Then the contacts of the switches 176 and 177 and the tension of the armature spring 189 are adjusted to give the most positive opening and closure of the switches 176 and 177 in response to the current variation produced by manipulation of the switch 188.

*Manual control of cutter movements*

The double-throw switch 181 is provided to enable the windings 60 and 61 to be energized selectively under manual control so that the operator may cause the cutter 1 to move in one direction or the other under the power of its driving motor 48. To condition the circuits for such control, the switch actuator 182 is thrown upwardly so as to connect the conductors 179 and 180 to conductors 190 and 191 leading respectively to terminals of switches 192 and 193 which have a common actuator 194 connected by a conductor 195 to the power conductor 178.

*Operation*

The manner of setting the different parts of the machine preparatory to milling an open-face type of cam adapted for use with a follower which is adapted to rock about a fixed axis, and the operation of the machine during the milling will now be described, it being assumed that the control circuits have been properly conditioned with the aid of the test condensers 186 and 187.

With the master cam 3 and the roughly shaped work blank 2 rigidly mounted on their supporting spindles and the table 9 shifted to withdraw the blank axially out of cutting relation with respect to the tool, the shaft 66 (Fig. 12) and the wheel 40 are turned by hand to bring the axes of the cutter and the drum 31 into exact vertical alinement and to separate the axes by a distance exactly equal to the spacing of the roller and pivotal axes in the rocking follower with which the cam is to be used. Next, the table 9 is raised or lowered to bring the work and cutter axes to the same vertical level. Then the work table is moved horizontally a distance just equal to the mean radius of the cam to be formed at the highest point thereon plus half the diameter of the follower roller with which the cam is to be used.

After locking the table in the position above described with the tool in cutting relation to the work, the work spindle 7 is turned by the handwheel 27 until the feeler roller 103 contacts the highest point on the master cam surface. Then the parallelogram linkage is set and locked in exact parallel relation after which the drum is rotated by the motor 48 by manipulation of the manually operable switch lever 182 until the cutter just clears the work blank at the maximum diameter of the latter.

Next the work table is shifted forwardly which carries the blank axially into position to be engaged by the cutter upon the next movement of the latter toward the work axis. Then the tape is clamped at 119 and the controls thrown into operation by throwing the switch actuator 134 to the left. Next the tape 107 is adjusted with the aid of the micrometer screw 121 until the cutter just touches the work blank, after which the tape is firmly locked. Finally the motor 18 is started and the operation allowed to continue automatically for one revolution of the work blank.

Assuming now that when the cutter feed is placed within the control of the condenser, the winding 60 of the reversing mechanism becomes energized which means that the condenser plates are spaced more than .001 inch apart. This causes the relay winding 170 to be energized by current of an intensity insufficient to overcome the tendency of the relay spring 189. The switch 177 is thereby maintained closed. Energization of the winding 60 initiates movement of the tool-supporting cradle 31 in a direction to carry the cutter toward the work axis and the condenser plate 85 toward the plate 86. Such approach of the condenser plates causes a gradual decrease in the capacity reactance of the condenser and a corresponding increase in the current energizing the relay winding 170.

When the spacing of the condenser plates falls below .0009 inch and the capacity thereby rises above the mean range to which the circuits are set to respond, the force of the armature spring 189 will be overcome by the attractive force of the electromagnet 170 whereupon the switch 177 will be opened and the switch 176 closed. Energization of the clutch winding 61 reverses the direction of motion of the cutter by the power means. The subsequent feeding movement of the cutter away from the work axis is attended by a gradual decrease in the condenser capacity. When this change has progressed beyond the mean condenser capacity, the winding 170 again becomes deenergized to the point where the switch 176 is opened and the switch 177 allowed to again close. The resulting energization of the clutch winding 60 reverses the direction of the cutter feed and also the change in the condenser capacity.

From the foregoing, it will be apparent that the capacity of the condenser 5 is constantly increasing or decreasing according to the direction of motion of the cutter relative to the work. Thus, while the tracer roller 103 is traversing a true dwell surface of the master cam, the capacity of the condenser will be governed solely by the movements of the cutter and the latter will oscillate intermittently toward and from the work axis. The range of such oscillation is determined by the sensitivity of the circuits for measuring the condenser capacity. With one stage of current amplification and the condenser plates spaced approximately .001 inch apart, the present circuit arrangement will respond to cutter movements of less than .0001 inch.

The cutter also oscillates back and forth while the tracer is encountering a rise or fall of the master cam surface. This follows from the fact that the master cam is always rotated at such a slow speed that the rate at which the tracer moves in response to a rise or fall in the master surface being traversed is less than the rate at which the cutter may be fed toward or from the work axis. Thus, when the tracer encounters a fall in the master cam, the intervals during which the cutter is fed into the work are longer than those during which outward movement of the cutter occurs.

It will be observed that in so far as the feeding movement of the cutter relative to the work blank is due to changes in the position of the condenser plate 86 which is actuated from the master cam, such movement is always in a direction to oppose the change in the condenser capacity produced by the master cam. That is to say, the cutter end, therefore, the plate 85 are fed in a direction to maintain a fixed space relationship between the condenser plates 85 and 86 and therefore a predetermined mean value of the condenser capacity. In this action, the plate 86 tends to follow the plate 85 with the result that the movement of the cutter, as it travels around the periphery of the work blank, accurately conforms to the contour of the pattern surface.

The roughing cut of the cam is completed in one revolution of the work blank. Then, by adjusting the nut 121 of the micrometer clamp 119, the condenser control may be conditioned for the finishing cut of the cam surface which is accomplished in another revolution of the work.

Safety control

To obviate the danger of disfiguring a partially cut cam or damaging the machine in the event that the condenser plates are moved relative to each other beyond their normal range, means is provided which operates automatically to render the cutter and work blank feed drives ineffectual. In the present instance, the trouble is indicated by a sensitive feeler which is capable of detecting either the approach of the plates beyond a predetermined point toward each other or separation of the plates beyond a predetermined point, both of which points being outside of the normal range of relative movement between the plates.

The sensitive feeler herein employed is in the form of a lever 197 (Figs. 3, 6 and 15) swingable vertically about a fulcrum pin 198 supported by the guide arm 128 near the fixed end of the latter. The lever has a short bifurcated arm carrying adjustable screws 199 through the medium of which the lever is actuated by a horizontal arm 200 pivoted on a pin 201 (Fig. 7) and normally made rigid with the plate 105 by a clamping bolt 202 in such position that the free end of the arm is disposed between the opposed ends of the screws 199. Thus, the relative movement between the condenser plates is communicated to and multiplied by the lever 197.

The outer end of the elongated arm of the lever is disposed between two adjustable contacts 203 and cooperates therewith to form two switches 204 and 205 which are connected in parallel with each other and in series with a winding 206 of an electromagnetic switch 207. By proper adjustment of the screws 199 and 203, the feeler may be so set that the switch 204 will be closed when the plates 85 and 86 separate more than a predetermined distance and the switch 205 will be closed when the plates approach too close to each other. Both points of closure of the switches are beyond the normal range of relative movement between the condenser plates so that both switches will ordinarily be open and will so remain as long as all of the machine is functioning properly.

Closure of either of the switches 204 and 205, causes the winding 206 to be energized from a source of current thereby attracting an armature 208 which opens the switch 207 causing deenergization of an electromagnetic relay 209 whose armature is thereby allowed to move in a direction to open switches 210 and 211 which control the operation of the work and cutter feed motors 18 and 48. In this way the milling operation is suspended automatically before damage is done to the work or to the machine parts.

I claim as my invention:

1. In a machine for reproducing on a work blank the contour of a pattern surface, the combination of a work support, a tool support, power driving means, two electromagnetically controlled clutches operable selectively to cause feeding movement of one of said supports in opposite directions by said power means, a condenser comprising two opposed plates adapted for movement toward and away from each other, one of said plates being movable in unison with said movable support, a control element adapted to trace said pattern surface automatically and to move said other condenser plate in accordance with changes in the contour of said surface, means operating to detect variations in the capacity of said condenser including an electromagnet having an armature movable in opposite directions respectively as the condenser capacity rises above or falls below a predetermined value, and a pair of switches selectively controlling the energization of said clutches and each adapted to be closed and opened respectively in the movement of said armature in opposite directions.

2. A machine for actuating a cutting tool to reproduce the contour of a pattern surface comprising, in combination, power driving means for feeding said tool, a reversing mechanism controlling the direction of motion of the tool by said driving means, an element for tracing said surface, means for effecting continuous relative motion between said surface and said element whereby to present different portions of the former to the latter, a condenser of variable capacity having two members connected respectively to and movable with said tool and tracing element, means controlling said reversing mechanism and operable in response to an increase in capacity above a predetermined value to cause said tool to be advanced in a direction to cause a decrease in said capacity, said last mentioned means acting in response to a decrease in the capacity below a predetermined value to cause reverse movement of said tool and an increase in the condenser capacity.

3. In a machine for controlling the feeding of a tool relative to a work blank so as to reproduce on the latter a surface conforming to the contour of a pattern, said machine combining a tracer element arranged to follow the pattern surface, a common means supporting said pattern and blank in operative association with said element and tool respectively, means supporting said tool for feeding movement into and out of said blank, power-driven means for moving said first mentioned supporting means to present successive portions of said pattern to said tracer element and corresponding portions of said blank to said tool, power driven means for moving said tool supporting means, a condenser comprising two closely spaced plates connected respectively to said element and tool and adapted for movement in unison while said tool and tracer element are in a predetermined positional relation and for limited relative movement according to variations in such relation, and means responsive to changes in capacity of said condenser and controlling said last mentioned power driven means to cause the tool supporting means to be fed in directions such as to maintain a substantially uniform spacing of said condenser plates regardless of the position of the condenser plate controlled from said tracer.

4. In a machine for controlling the feed of a tool to reproduce on a work blank the contour of a pattern surface, said machine combining means supporting the pattern and said blank for rotation in unison about a common axis, a feeler contacting a peripheral surface of said pattern and adapted during the rotation of the pattern to move in opposite directions along a fixed path according to variations in the surface contour, means supporting said tool for movement to different depths into and out of a peripheral surface of said blank, reversible power driving means for feeling said tool supporting means, a condenser the capacity of which varies solely as a function of the spacing of its plates, means for varying the condenser capacity in accordance with the movements both of said feeler and said tool supporting means, and means responsive to changes in the condenser capacity and controlling said power driving means to cause said tool supporting means to move in a direction to oppose a change in the condenser capacity produced by movement of said feeler.

5. In a machine for controlling the feed of a cutting tool to reproduce on a work blank the contour of a pattern surface, a support for said blank and the pattern, a feeler for tracing the pattern surface, a support for said tool, a condenser of a variable capacity which is changed automatically in response to relative movement between said feeler and said pattern and also in response to relative movement between said tool and work blank, power driven means for causing relative feeding movements in different directions between said tool and work blank, and means responsive to changes in the capacity of said condenser and controlling the direction of operation of said power driving means to maintain the condenser capacity at substantially constant value.

6. In a machine for controlling the feed of a cutting tool to reproduce on a work blank the contour of a pattern surface, a feeler arranged to trace the pattern surface automatically, a condenser having its plates mechanically associated with said feeler and said tool so that the spacing of the plates varies with changes in the relative positions of said tool and feeler, and power actuated means acting in response to changes in the condenser capacity to feed said tool varying distances in opposite directions so as to maintain a substantially uniform spacing of the condenser plates while said feeler is tracing the pattern surface and said tool is being presented to different portions of said work blank.

7. In a machine having a work support and a tool support mounted for relative feeding movement therebetween, the combination of means for moving one of said supports relative to the other including a reversing device having an electromagnetic control means, a pattern controlled element, a condenser having relatively movable plates connected respectively to said element and said movable support, and means responsive to changes in the capacity of said condenser for governing the energization of said electromagnetic means.

8. In a machine for reproducing a pattern surface on a work blank, the combination of a work support, a support carrying a cutting tool, a condenser comprising two closely spaced plates, means for imparting relative feeding movements between said supports to one of said plates whereby to vary the condenser capacity, means for varying the spacing of the condenser plates continuously according to variations in the contour of the pattern surface, power driving means for moving one of said supports in opposite directions relative to the other support, and means responsive to the capacity of said condenser and controlling the direction of movement of the movable support by said power driving means so as to maintain said plates slightly removed from contacting engagement with each other.

9. In a machine for reproducing on a work blank the contour of a pattern, the combination of a combined work and pattern support, a movable tool support, a feeler adapted to trace a surface of said pattern, a condenser whose capacity varies with changes in the positional relation between said feeler and tool support, means responsive to changes in the condenser capacity including an electromagnet having an armature arranged to move in opposite directions when the condenser capacity rises above and falls below a predetermined capacity range, power means for feeding said tool support in opposite directions, and a reversing device governing the direction of such feed and arranged to be controlled selectively by said armature.

10. A pattern reproducing machine having, in combination, a cutter, a pattern tracer, and means including a variable capacity condenser for controlling the feed of said cutter to reproduce the movements of said tracer.

11. A pattern reproducing machine combining a cutter, power actuated mechanism for feeding said cutter continuously in one of a plurality of different directions, a pattern-controlled member, a condenser the capacity of which is varied continuously in accordance with changes in the positional relation of said cutter and member, and detecting means responsive to such capacity changes to govern the direction of the cutter feed by said mechanism.

12. In a pattern reproducing machine, the combination of a power actuated mechanism for effecting relative feeding movements between a cutter and a work blank, a condenser having elements arranged for relative movement according to the contour of a pattern and closely spaced so that a small variation in the spacing of the elements will effect a relatively large variation in the condenser capacity, and means responsive to the capacity of the condenser and acting to control the direction of the feed by said mechanism.

13. In a machine for controlling the feed of a cutting tool to reproduce on a work blank the contour of a pattern surface, a feeler arranged to trace the pattern surface automatically, a pair of closely spaced control elements mounted for broadwise approaching and receding movement relative to each other and having opposed edges defining a narrow elongated gap, said elements being connected respectively to said feeler and tool so that the area of said gap varies with changes in the positional relationship of said elements, and power actuated means responsive to changes in the area of said gap and acting to feed continuously said tool in one direction when the area of said gap exceeds a predetermined value and in a different direction when the area is less than a predetermined value.

14. In a machine for controlling the feed of a cutting tool to reproduce on a work blank the contour of a pattern surface, a feeler arranged to trace the pattern surface automatically, a pair of closely spaced control elements mounted for sidewise approaching and receding movement relative to each other in response to changes in the positional relation between said feeler and tool, the opposing edges of said elements defining a narrow elongated slit between them, and power actuated means acting in response to variations in the relative spacing of said elements to feed said tool constantly in one of a plurality of different directions whereby to maintain a substantially uniform spacing of said elements and therefore agreement in the positional relation of said feeler and tool.

15. In a pattern reproducing machine, the combination of a power actuated mechanism for effecting relative feeding movements between a cutter and a work blank, a control device including two elements having two closely spaced parallel edges defining a narrow elongated slit between them, means for varying the spacing of said elements according to a pattern contour, and means responsive to variations in the spacing of said elements to control continuously the direction of feed by said mechanism.

16. In a machine for reproducing the contour of a pattern, the combination of power actuated feeding means for effecting relative movement between a tool and a work blank to vary the depth of the cut made by the former, a control device comprising two elements the positional relation of which is varied automatically in accordance with variations in the pattern contour and also with changes in the relation of said tool and work blank, an electromagnet arranged to be energized constantly by current which varies progressively with changes in the positional relation of said elements, and means controlled by said magnet for governing the operation of said feeding means in one direction when the current intensity increases above a predetermined value and in a different direction when the current falls below a predetermined value.

17. In a machine for reproducing a pattern, the combination of a tracer adapted to follow the pattern contour, power actuated feeding means for effecting relative movement between a tool and a work blank to vary the depth of cut made by the former, power actuated means for causing successive sections of said pattern and work blank to be presented to said tracer and tool independently of the relation of the tool and work blank, a pair of control elements the positional relation of which is varied differentially according to the relation of said tool and blank and also according to the relation of said tracer and pattern, a thermionic device having an input circuit controlled from said elements so that the current in its output circuit fluctuates progressively with changes in the positional relation of the elements, an electromagnet arranged to be variably energized in accordance with said current fluctuations, and means controlled by said electromagnet governing the operation of said power feeding means to determine the direction of the relative motion between said tool and work blank while said tracer is traversing the pattern surface.

18. In a machine for reproducing a pattern contour on a work blank, the combination of a work support, a support carrying a cutting tool, an electrical device having a reactance which varies with relative movement between said supports, means arranged to trace the pattern surface and to cause said reactance to be varied progressively in accordance with the contour thereof, means for detecting changes in said reactance including a constantly energized electromagnet, power actuated means for feeding one of said supports in different directions, and means responsive to the degree of energization of said magnet for controlling the direction of movement of said movable support by said power means.

19. In a machine for reproducing a pattern contour on a work blank, the combination of a work support, a support carrying a cutting tool, an electrical device having a reactance which varies with relative movement between said supports, means arranged to trace the pattern surface and to cause said reactance to be varied in accordance with the contour thereof, power actuated means acting constantly to feed one of said supports in one direction or another to vary the depth of cut made by said tool, and control means for said power means responsive to changes in said reactance and acting to cause the movable support to be advanced in a direction to oppose the change in reactance produced under the control of said pattern.

20. In a machine for maintaining a predetermined positional relation between a cutting tool and a pattern controlled element while the latter is tracing the pattern surface, the combination of a condenser the capacity of which is varied progressively in accordance with changes in the positions of said tool and element, an electrical resistance connected in series relation with said condenser, means impressing an alternating current voltage across said condenser and resistance, a thermionic device having the voltage drop across said resistance impressed upon its input circuit, an electromagnet adapted to be variably energized in response to current fluctuations in the output circuit of said device, and power driving means for causing relative feeding movements between said tool and a work blank, and a reversing device controlling the direction of such feed in response to said electromagnet.

21. In a machine for governing the relative feeding movements between a cutting tool and a work blank in accordance with the contour of a pattern surface, the combination of a control device having an electrical impedance the value of which is varied with said feeding movements and in accordance with the contour of said pattern, a resistance element of a predetermined value in series with said device, means impressing an alternating current voltage across said control device and said element, an electromagnet, means acting in response to fluctuations in the voltage across said resistance element to produce corresponding fluctuations of unidirectional current in said electromagnet, and power driving means for causing said feeding movements controlled by said electromagnet.

22. In a machine for governing the relative feeding movements between a cutting tool and a work blank in accordance with the contour of a pattern surface, the combination of a condenser the capacity of which is varied with said feeding movements and in accordance with the contour of said pattern, a fixed resistance element in series with said condenser, means impressing an alternating current voltage across said condenser and said element, a thermionic device having input and output circuits, the voltage fluctuations across said resistance element produced by variations in the spacing of the condenser plates being impressed upon said input circuit, means for amplifying the unidirectional current fluctuation in said output circuit, an electromagnet arranged to be variably energized by the amplified current, and power means controlled according to the degree of energization of said electromagnet for feeding said tool and work blank relative to each other in opposite directions.

23. In a machine for controlling the feed of a cutting tool to reproduce a pattern on a work blank, the combination of a pair of closely spaced metallic plates constituting a condenser having a predetermined mean capacity which is varied automatically according to the contour of a pattern surface and to changes in the relative positions of said tool and work blank, power driven means for controlling the relation of said tool and said blank, a fixed resistance connected in series with said condenser, means impressing an alternating current voltage across said condenser and resistance, a thermionic device having the voltage drop across said resistance impressed upon its input circuit, an electromagnet selectively controlling said power driven means responsive to current fluctuations in the output circuit of said tube, a second condenser having a fixed capacity equivalent to the mean value of said variable condenser and adapted to be substituted for the latter in series with said resistance while the circuits for said tube are being conditioned, and a third condenser of relatively lower capacity adapted to be thrown into and out of parallel relation with respect to said second condenser to produce an effect simulating a minute variation in the spacing of the variable condenser plates.

24. In a machine for controlling the feed of a cutting tool to reproduce a pattern on a work blank, the combination of a pair of closely spaced metallic plates constituting a condenser having a predetermined mean capacity which is varied automatically according to the contour of a pattern surface and to changes in the relative positions of said tool and work blank, power driven means for controlling the relation of said tool and said blank, means for detecting minute variations in the capacity of said condenser including a thermionic device having input and output circuits, power driven means for effecting relative feeding movement between said tool and blank, electromagnetic means controlling the direction of such feed in response to current fluctuations in said output circuit, and means for permitting sensitive adjustment of the circuits for said device including a second condenser having a fixed value corresponding to the mean value of said variable condenser.

25. In a machine for reproducing the contour of a pattern, the combination of a control device responsive to changes in the positional relation of a cutting tool and a pattern controlled object, a thermionic device having its input circuit controlled by said control device, power actuated means for effecting relative feeding movements between said tool and a work blank, means controlled by current fluctuations in the output circuit of said thermionic device for determining the direction of feed of said tool by said power actuated means, and a test device of a fixed character corresponding to a predetermined relation of said tool and said object, said test device being adapted to be substituted for said control device during conditioning of the circuits of said thermionic device.

26. In a machine for reproducing the contour of a pattern, the combination of a control device responsive to changes in the positional relation of a cutting tool and a pattern controlled object, a thermionic device having its input circuit controlled by said control device, power actuated means for effecting relative feeding movements between said tool and a work blank, means controlled by current fluctuations in the output circuit of said thermionic device for determining the direction of feed of said tool by said power actuated means, and testing means adapted to be substituted for said control device and to be operated so as to produce in said thermionic device an effect corresponding to a predetermined variation in the positional relation of said tool and said object.

27. In a machine for varying the positional relation of a controlled object in accordance with changes in the position of a controlling object, the combination of means for effecting movement of said controlled object in one direction or the other, a condenser the capacity of which is varied automatically and progressively with changes in the positions of said objects, and electromagnetic means responsive to the value of said capacity and controlling said power actuated means to reverse the direction of movement of said controlled object when the value of said capacity rises above or falls below a predetermined value.

28. The combination with an object to be moved to different positions according to the position of a controlling object, of power driven mechanism for moving said controlled object, a condenser the capacity of which is varied by changes in the positions of each of said objects, and means responsive to the capacity of said condenser and controlling said mechanism to cause movement of said controlled object in one direction until the capacity of said condenser has been changed to a predetermined value.

29. Mechanism for causing a controlled object to follow the movements of a controlling object comprising closely spaced control elements movable relative to each other with changes in the position of each of said objects, and means responsive to the spacing of said elements and operating to move said controlled object to maintain a uniform spacing of the elements.

30. The combination with an object to be moved to different positions according to the position of a controlling object, of power driven mechanism for moving said controlled object, an electrical device having a reactance which varies progressively with relative movement between said objects, and control means for said mechanism responsive to changes in said reactance and acting to cause said controlled object to be moved in a direction such as to oppose the change in reactance produced by movement of said controlling object.

31. In a machine for positioning a controlled object in accordance with changes in the position of a controlling object, the combination of power driving means for moving said controlled object, a control device comprising two elements the positional relation of which is varied automatically in accordance with variations in the positions of both of said objects, an electromagnet arranged to be energized constantly by current which varies progressively with changes in the positional relation of said elements, and means controlled by said magnet for governing the operation of said driving means in one direction when the current intensity increases above a predetermined value and in a different direction when the current falls below a predetermined value.

32. Apparatus of the class described comprising, in combination, a control device responsive to changes in the positional relation of a controlling object and a controlled object, a thermionic device having its input circuit controlled by said control device, power actuating means for moving said controlled object and means controlled by the current fluctuations in the output circuit of said thermionic device for determining the direction of movement of said controlled object by said power actuated means, and testing means adapted to be substituted for said control device and to be operated to produce in said thermionic device an effect corresponding to a predetermined variation in the positional relation of said objects.

33. In combination, a work holder, a tool, a pattern, a tracer controlled by said pattern, a device having an electrical characteristic continuously variable by and in and out movement of said tracer, means for traversing said tool and work and said pattern and tracer respectively, and means continuously controlled by variations of said electrical characteristic to cause said tool and work to be moved relatively laterally of their relative traverse in accordance with said pattern.

34. A mechanism comprising, in combination, a work holder, a tool, a pattern, a tracer device for said pattern, means for relatively traversing said work holder and tool and said pattern and tracer respectively, means for producing relative feeding movement transversely of said traversing movements between said tool and work holder, said mechanism including means having electrical capacity varied by said device, and means responsive to variations in such capacity for controlling said feeding means in directions to minimize such variations.

DUNCAN J. STEWART.